(12) United States Patent
Pan

(10) Patent No.: US 8,512,574 B2
(45) Date of Patent: Aug. 20, 2013

(54) GRIT REMOVING DEVICE, GRIT REMOVING SYSTEM AND A METHOD FOR THE SAME

(75) Inventor: Wenzhi Pan, Beijing (CN)

(73) Assignee: Beijing Helee Bio-Energy Technology Co., Ltd., Beijing (CN)

( * ) Notice: Subject to any disclaimer, the term of this patent is extended or adjusted under 35 U.S.C. 154(b) by 307 days.

(21) Appl. No.: 12/986,462

(22) Filed: Jan. 7, 2011

(65) Prior Publication Data

US 2011/0186528 A1 Aug. 4, 2011

(30) Foreign Application Priority Data

Feb. 1, 2010 (CN) .......................... 2010 1 0104399

(51) Int. Cl.
| | |
|---|---|
| B01D 21/06 | (2006.01) |
| B01D 21/26 | (2006.01) |
| B01D 21/28 | (2006.01) |
| B01F 7/06 | (2006.01) |
| B01F 15/02 | (2006.01) |
| B01D 21/24 | (2006.01) |

(52) U.S. Cl.
CPC ............ *B01D 21/06* (2013.01); *B01D 21/2461* (2013.01); *B01D 21/26* (2013.01); *B01D 21/28* (2013.01); *B01F 7/06* (2013.01); *B01F 15/02* (2013.01)
USPC ........ 210/787; 210/801; 210/803; 210/512.3; 210/524; 210/528; 366/186; 366/195; 366/292

(58) Field of Classification Search
USPC ............. 210/787, 800, 801, 803, 259, 512.1, 210/512.3, 523, 524, 528, 532.1; 366/186, 366/195, 292
See application file for complete search history.

(56) References Cited

U.S. PATENT DOCUMENTS

| | | | | |
|---|---|---|---|---|
| 2,425,932 | A * | 8/1947 | Green ............................ | 210/524 |
| 2,678,912 | A * | 5/1954 | Kalinske et al. ............... | 210/523 |
| 2,846,072 | A * | 8/1958 | Goetz ............................. | 210/524 |
| 2,935,201 | A * | 5/1960 | Kivari et al. ................. | 210/532.1 |
| 2,987,185 | A * | 6/1961 | Feeney .......................... | 210/528 |
| 4,222,879 | A * | 9/1980 | Hill ................................ | 210/528 |
| 4,767,532 | A * | 8/1988 | Weis .......................... | 210/512.3 |
| 5,203,630 | A * | 4/1993 | Howk ........................... | 366/292 |
| 5,658,076 | A * | 8/1997 | Crump et al. ................. | 366/292 |
| 6,676,833 | B2 * | 1/2004 | Castleberry ................. | 210/221.1 |
| 7,067,065 | B2 * | 6/2006 | Schloss ......................... | 210/523 |

* cited by examiner

*Primary Examiner* — Christopher Upton
(74) *Attorney, Agent, or Firm* — J.C. Patents

(57) ABSTRACT

The present invention relates to a grit chamber, wherein the chamber body of the grit chamber is in the shape of a hollow cylinder with a cone-shaped bottom; a grit channel is installed below the center of the cone-shaped bottom; a grit removing device is installed in the grit channel; a wall mixer, a plurality of vertical mixers and a spiral grit remover are installed in the chamber body; the wall mixer is installed on the wall of the hollow cylinder; the spiral grit remover is installed in the center of the cylinder, and is provided with a grit-removing blade for removing the grit on the cone-shaped bottom; and the vertical mixers are installed at the position close to the cone-shaped bottom and are vertical to the wall. The invention also provides a grit removing system containing a grit chamber and a grit removing method. With the vertical mixers and the wall mixer, the grit removing device is capable of efficiently and completely sinking the grit in the dung of domestic animals into water bottom so as to completely separate the grit from the dung of domestic animals. In the process of material transportation, the feathers contained in the dung of domestic animals pass through a cutting and filtering device so that the feathers become fermentation material.

12 Claims, 2 Drawing Sheets

GRIT REMOVING DEVICE, GRIT REMOVING SYSTEM AND A METHOD FOR THE SAME

CROSS-REFERENCE TO RELATED APPLICATIONS

This application claims priority to Chinese Patent Application No. 201010104399.X, filed on Feb. 1, 2010, entitled "Grit chamber, grit removing device for chicken dung and a method for grit removing", which is incorporated herein by reference in its entirety.

FIELD OF THE TECHNOLOGY

The invention relates to the filed of dung and sewage treatment, in particular to a grit chamber, a grit removing device and a grit removing method.

BACKGROUND

Many domestic animals such as fowl and chicken usually have grit and feathers in their dung, for example, chicken have short digestive tract but no teeth, food is grinded by means of muscular stomach having grit so that food can be grinded to help digestion, thus a great deal of grit is contained in chicken dung and chicken feathers are mixed in the chicken dung; it will cause problems when using the chicken dung as the material of fermentation, pretreatment of separating the grit in the dung needs to be carried out before entering an anaerobic treatment tank so as to prevent the problems of the grit depositing in the anaerobic treatment tank, and the blocking of pipeline and pump and low gas yield in operation process, and the like; therefore, how to remove the grit in the chicken dung and the dung of other domestic animals is very important. The method of natural deposition and hand salvaging is used in the conventional chicken dung degriting; since the chicken dung contains a great deal of grit with tiny grain size and has high viscosity, the grit cannot be completely removed through the above method; moreover, the method wastes time and labor and is relatively difficult to carry out.

SUMMARY

The invention aims to provide a grit chamber, a grit removing device and a grit removing method capable of completely removing the grit and the feathers in the dung of domestic animals in the mixing process of the dung and sewage.

In order to achieve the purpose, the technical solution of the invention provides a grit chamber, wherein the chamber body of the grit chamber is in the shape of a hollow cylinder with a cone-shaped bottom; a grit channel is installed below the center of the cone-shaped bottom; a grit removing device is installed in the grit channel; a wall mixer, a plurality of vertical mixers and a spiral grit remover are installed in the chamber body; the wall mixer is installed on the wall of the hollow cylinder; the spiral grit remover is installed in the center of the hollow cylinder, and is provided with a grit-removing blade for removing the grit deposited on the cone-shaped bottom; and the vertical mixers are installed at the position close to the cone-shaped bottom and are vertical to the wall. Preferably, the cone-shaped bottom is divided into a first cone-shaped bottom positioned at the middle portion of the chamber bottom and a second cone-shaped bottom surrounding the first cone-shaped bottom; the grit channel is installed below the first cone-shaped bottom; and the vertical mixers are installed at the position close to the second cone-shaped bottom. Preferably, the angle between the first cone-shaped bottom and the ground plane is larger than that between the second cone-shaped bottom and the ground plane. Preferably, three vertical mixers are uniformly distributed at the position close to the second cone-shaped bottom. Preferably, the wall mixer is installed on the wall close to a dung inlet of the chamber body.

The invention further provides a grit removing system comprising a grit chamber, wherein the chamber body of the grit chamber is in the shape of a hollow cylinder with a cone-shaped bottom; a grit channel is installed below the center of the cone-shaped bottom; a grit removing device is installed in the grit channel; a wall mixer, a plurality of vertical mixers and a spiral grit remover are installed in the chamber body; the wall mixer is installed on the wall of the hollow cylinder; the spiral grit remover is installed in the center of the hollow cylinder, and is provided with a grit-removing blade for removing the grit deposited on the cone-shaped bottom; and the vertical mixers are installed at the position close to the cone-shaped bottom and are vertical to the wall, the system further includes: a homogenization chamber connected with the grit chamber, wherein the chamber body of the homogenization chamber is in the shape of a hollow cylinder with a cone-shaped bottom; one or more vertical mixers are installed in the chamber body; and a grit removing device is installed on the cone-shaped bottom. Preferably, the number of the homogenization chambers is two. Preferably, the system further comprises a cutting machine installed between the grit chamber and the homogenization chamber, and the cutting machine is used for cutting feathers of the domestic animals, for example, the chicken feathers.

The invention further provides a grit removing method, comprising the following steps: mixing the dung of the domestic animals in the grit chamber by using the vertical mixer and the wall mixer so that the grit contained in the dung of the domestic animals is deposited on the cone-shaped bottom of the grit chamber; removing the grit deposited on the cone-shaped bottom by using the spiral grit remover so that the grit enters the grit channel installed below the cone-shaped bottom; using the grit removing device installed in the grit channel to discharge the grit from the grit chamber. Preferably, the method further comprises the following steps after discharging the grit from the grit chamber by using a grit removing device installed in the grit channel, guiding the dung of the domestic animals, after the grit is removed, into the cutting machine connected with the grit chamber, and cutting the chicken feathers contained in the dung of the domestic animals by using the cutting machine; guiding the dung of the domestic animals, after the chicken feathers are cut, into the homogenization chamber connected with the cutting machine, mixing the dung of the domestic animals by using the vertical mixers installed in the homogenization chamber, and carrying out a secondary grit removing through the grit removing device.

Preferably, the grit removing method is used for removing the grit in the chicken dung and cutting the chicken feathers in the chicken dung.

With the vertical mixer and the wall mixer, the grit removing device is capable of efficiently and completely sinking the grit in the dung of the domestic animals into water bottom so as to completely separate the grit from the dung of the domestic animals. In the process of material transportation, the chicken feathers contained in the dung of the domestic animals pass through a cutting and filtering device so that the chicken feathers become fermentation material. The grit chamber is designed to have a cone-shaped bottom, and the cone-shaped bottom is provided with a grit channel, therefore, capable of efficiently removing the grit into the grit channel through a grit remover. The grit removing device is installed from the grit channel to outside of the grit chamber, so as to discharge the grit in the grit channel out of the grit chamber completely.

BRIEF DESCRIPTION OF THE DRAWING(S)

Figure 1:
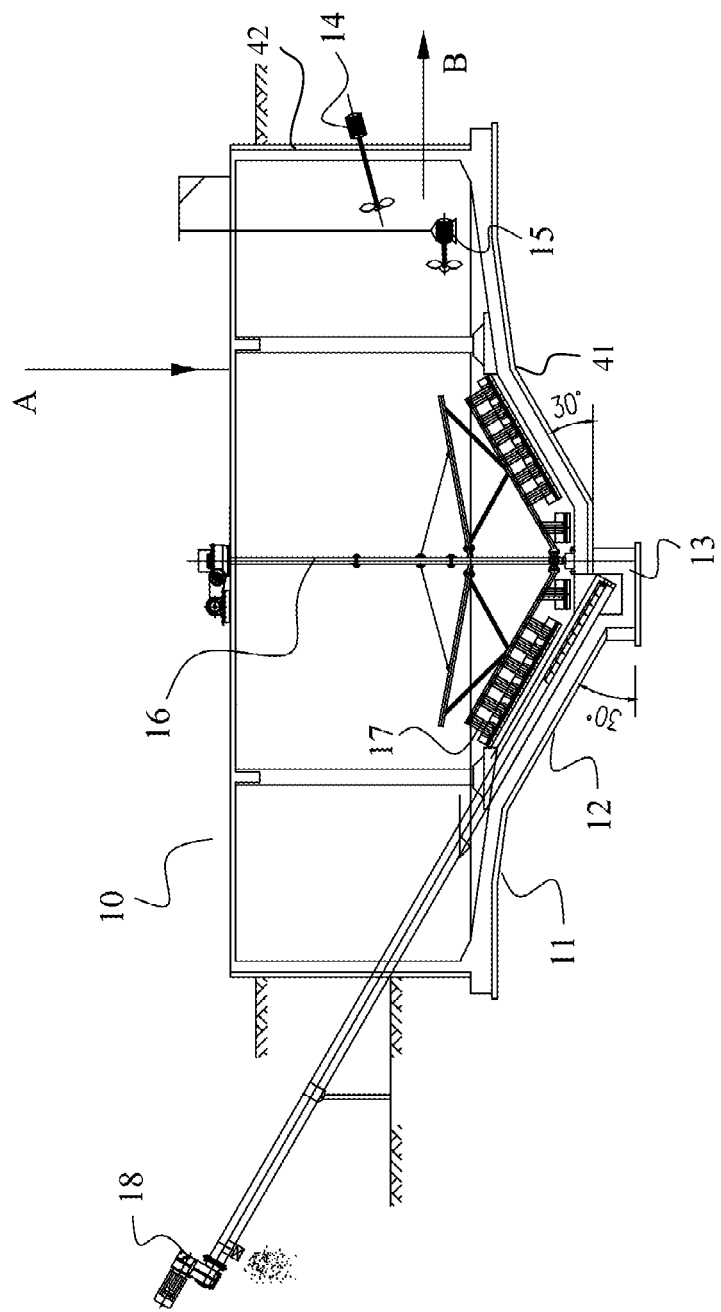
FIG. 1 is a schematic structural diagram of the grit chamber according to an embodiment of the invention.

In the Drawings: 10, grit chamber; 11, second cone-shaped bottom; 12, first cone-shaped bottom; 13, grit channel; 14, wall mixer; 15, vertical mixer; 16, spiral grit remover; 17, grit-removing blade; 18, grit removing device; 20, cutting machine; 21, lift pump of homogenization chamber; 30, first homogenization chamber; 31, vertical mixer; 32, second homogenization chamber; 33, vertical mixer; 34, grit removing device; 35, grit removing device; 36, grit washing chamber; 37, grit removing device; 38, reflux pump of grit washing chamber; A, dung inlet; B, dung outlet; C, dung outlet.

DETAILED DESCRIPTION

The following embodiments are used for describing the invention, but not used for limiting the scope of the invention.

FIG. 1 is a schematic structural diagram of the grit chamber according to the embodiment of the invention. As shown in FIG. 1, the volume of the grit chamber 10 in the embodiment is 1000 m3, wherein the chamber body is in the shape of a hollow cylinder with a cone-shaped bottom 41, the hollow cylinder is 5 m high, a grit channel 13 is installed below the center of the cone-shaped bottom 41; a grit removing device 18 is installed in the grit channel 13; a wall mixer 14, a plurality of vertical mixers 15 and a spiral grit remover 16 are installed in the chamber body. The wall mixer 14 is installed on the wall 42 of the hollow cylinder and positioned at about the middle portion of the wall 42 and close to a dung inlet, thereby facilitating the mixing of the fowl dung fed through the dung inlet. The spiral grit remover 16 is installed in the center of the hollow cylinder and integrally fixed at the center of the top of the grit chamber 10, and is provided with a grit-removing blade 17 for removing the grit on the cone-shaped bottom 41. The vertical mixers 15 are installed at the position close to the cone-shaped bottom 41, and the axis of the rotating shaft of the fan blade thereof is perpendicular to the wall 42 of the hollow cylinder.

The cone-shaped bottom 41 is divided into a first cone-shaped bottom 12 positioned at the central position of the chamber bottom and a second cone-shaped bottom 11 surrounding the first cone-shaped bottom 12; the grit channel 13 is installed below the first cone-shaped bottom 12; and the vertical mixers 15 are installed at a position close to the second cone-shaped bottom 11. The angle between the first cone-shaped bottom 12 and the ground plane is larger than that between the second cone-shaped bottom 11 and the ground plane.

In the embodiment, the angle between the first cone-shaped bottom 12 and the ground plane is 30 degree, and the angle between the second cone-shaped bottom 11 and the ground plane is 15 degree. Moreover, three vertical mixers 15 are uniformly distributed at a position close to the second cone-shaped bottom 11, and the three vertical mixers 15 and the wall mixer 14 propel water flow in the same direction.

The distance between the grit-removing blade 17 of the spiral grit remover 16 and the first cone-shaped bottom 12 is about 5 cm, thus the grit-removing blade at the bottom of the spiral grit remover can be prevented from contacting the bottom of a hydrolysis chamber and the grit can be efficiently removed.

Figure 2:
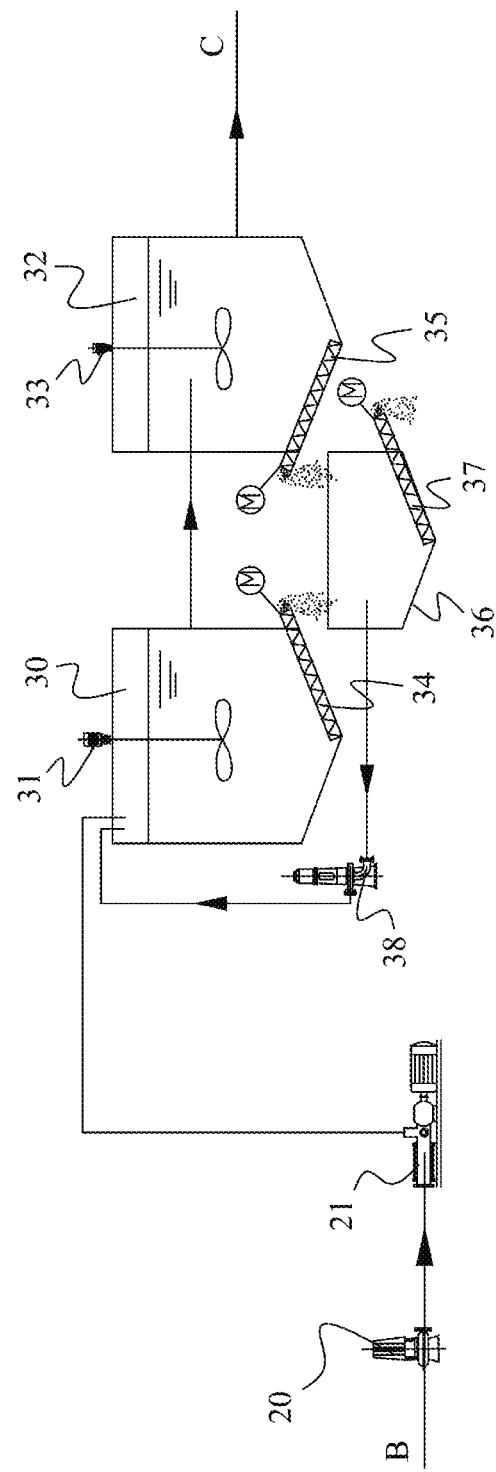
FIG. 2 is a schematic structural diagram of the cutting machine and the homogenization chamber according to an embodiment of the invention.

As shown in FIG. 2, the grit removing system according to the embodiment further comprises a homogenization chamber connected with the grit chamber 10. There are a first homogenization chamber 30 and a second homogenization chamber 32, wherein the chamber bodies of the two homogenization chambers are in the shapes of hollow cylinder with a cone-shaped bottom; the chamber body is internally provided with a vertical mixer 31 and a vertical mixer 33, respectively, and the cone-shaped bottom thereof is respectively provided with a grit removing device 34 and a grit removing device 35.

Moreover, a cutting machine 20 is further installed between the grit chamber 10 and the homogenization chamber, and the cutting machine 20 is used for cutting chicken feathers contained in the fowl dung, for example the chicken dung.

The following is the description of the grit removing process of the chicken dung.

The chicken dung enters the grit chamber 10 through a dung inlet A, and the wall mixer 14 and the vertical mixers 15 mix the chicken dung entering the grit chamber 10 so that the grit sinks into the cone-shaped bottom; the grit-removing blade 17 of the spiral grit remover 16 removes the grit deposited on the first cone-shaped bottom 12 into the grit channel 13; and then, the grit is discharged from the grit chamber through the grit removing device 18 extending into the grit channel 13. The chicken dung in the grit chamber 10 after the above first grit removing enters the cutting machine 20 through a dung outlet B, and chicken feathers contained in the chicken dung are cut by the cutting machine 20. And then, the feathers are transported to the two serially connected homogenization chambers 30 and 32 through a material transport device, for example, lift pump of homogenization chamber 21, and mixed by the vertical mixers 31 and 33 installed in the homogenization chambers so that the remaining grit sinks into the bottom of the homogenization chambers and the grit is discharged in the grit washing chamber 36 through the respective grit removing device 34 and 35. The grit is washed in the grit washing chamber 36 so that the grit is further deposited and discharged from the grit washing chamber through the grit removing device 37. The chicken dung from grit washing chamber 36 enters the homogenization chamber 30 again through the reflux pump 38 of grit washing chamber 36. Finally, the chicken dung is discharged from a dung outlet C.

The above contents are just the preferable embodiment of the invention. It should be pointed out that improvements and variations can be carried out based on the technical principle of the invention by a person skilled in the technical field, thus the improvements and variations also should be regarded as within the scope of the invention.

What is claimed is:

1. A grit chamber, characterized in that a chamber body of the grit chamber is in the shape of a hollow cylinder with a cone-shaped bottom; a grit channel is installed below a center of the cone-shaped bottom; a grit removing device is installed in the grit channel and configured to discharge grit from the grit channel; a wall mixer, a vertical mixer and a spiral grit remover are installed in the chamber body; the wall mixer is installed on a wall of the hollow cylinder; the spiral grit remover is installed at a position adjacent to the cone-shaped bottom and fixed to a center of a top cover of the grit chamber, and is provided with a grit-removing blade for removing grit on the cone-shaped bottom into the grit channel; and the vertical mixer is installed at a position close to the cone-shaped bottom and fixed to the top cover of the grit chamber, and a rotating shaft of the vertical mixer is perpendicular to the wall of the hollow cylinder.

2. The grit chamber according to claim 1, characterized in that the cone-shaped bottom is divided into a first cone-shaped bottom positioned at a center position of the cone-shaped bottom and a second cone-shaped bottom surrounding the first cone-shaped bottom; the grit channel is installed below the first cone-shaped bottom; and the vertical mixer is installed at a position close to the second cone-shaped bottom.

3. The grit chamber according to claim 2, characterized in that an angle between the first cone-shaped bottom and a ground plane is larger than that between the second cone-shaped bottom and the ground plane.

4. The grit chamber according to claim 2, characterized in that three said vertical mixers are uniformly distributed along circumference of the hollow cylinder at the position close to the second cone-shaped bottom.

5. The grit chamber according to claim 1, characterized in that the wall mixer is installed on the wall close to a dung inlet of the chamber body.

6. A grit removing system comprising the grit chamber according to claim 1, characterized in that the system further comprises a homogenization chamber for receiving the dung of domestic animals discharged from the grit chamber after the grit is removed, wherein a chamber body of the homogenization chamber is in the shape of a hollow cylinder with a cone-shaped bottom; a vertical mixer is installed in the chamber body of the homogenization chamber; and a grit removing device is installed on the cone-shaped bottom of the homogenization.

7. The grit removing system according to claim 6, characterized in that there are two said homogenization chambers arranged in series.

8. The grit removing system according to claim 6, further comprising a cutting machine installed between the grit chamber and the homogenization chamber, and the cutting machine is used for cutting feathers.

9. A method for removing grit from dung of domestic animals, comprising the following steps:
   mixing the dung of domestic animals in a grit chamber by using a vertical mixer and a wall mixer so that grit contained in the dung of domestic animals is deposited on a cone-shaped bottom of the grit chamber; wherein the wall mixer is installed on a wall of the grit chamber, and the vertical mixer is installed at a position close to the cone-shaped bottom and fixed to a top cover of the grit chamber;
   removing the grit deposited on the cone-shaped bottom by using a spiral grit remover so that the grit enters a grit channel installed below the cone-shaped bottom; wherein the spiral grit remover is installed at a position adjacent to the cone-shaped bottom and fixed to a center of the top cover of the grit chamber, and provided with a grit-removing blade for removing grit on the cone-shaped bottom into the grit channel;
   using a grit removing device installed in the grit channel to discharge the grit from the grit chamber.

10. The method according to claim 9, further comprising the following steps after discharging the grit from the grit chamber by using a grit removing device installed in the grit channel:
    guiding the dung of domestic animals, after the grit is removed, into a cutting machine connected with the grit chamber, and cutting feathers contained in the dung of domestic animals by the cutting machine;
    guiding the dung of domestic animals, after the feathers are cut, into a homogenization chamber connected with the cutting machine, mixing the dung of domestic animals by a vertical mixer installed in the homogenization chamber, and carrying out a secondary grit removing through a grit removing device installed in the homogenization chamber.

11. The method according to claim 9, characterized in that the dung of domestic animals is chicken dung.

12. The method according to claim 10, characterized in that the dung of domestic animals is chicken dung.

* * * * *